US011929842B2

(12) United States Patent
Linne et al.

(10) Patent No.: US 11,929,842 B2
(45) Date of Patent: Mar. 12, 2024

(54) BROADCAST PRIORITY FLAGS FOR ONLINE MEETINGS

(71) Applicant: MICROSOFT TECHNOLOGY LICENSING, LLC, Redmond, WA (US)

(72) Inventors: Aaron Linne, Bellevue, WA (US); Eric Scott Albright, Sammamish, WA (US); Albert Jose Mangay, Redmond, WA (US); Satya Sasikanth Bendapudi, Kirkland, WA (US); Jizhe Jin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/334,489

(22) Filed: May 28, 2021

(65) Prior Publication Data
US 2022/0385492 A1    Dec. 1, 2022

(51) Int. Cl.
H04L 12/18    (2006.01)
(52) U.S. Cl.
CPC ...... H04L 12/1822 (2013.01); H04L 12/1827 (2013.01)
(58) Field of Classification Search
CPC .................................................. H04L 12/1827
USPC .......................................................... 709/204
See application file for complete search history.

(56) References Cited

U.S. PATENT DOCUMENTS 8,155,115 B2    4/2012 Kallio et al.
8,755,511 B2    6/2014 Duva et al.
9,001,178 B1*   4/2015 Leske ................... H04N 5/265
                                                     348/14.08
9,621,853 B1    4/2017 Yang et al.
10,541,824 B2   1/2020 Bader-Natal et al.
2004/0119814 A1 6/2004 Clisham et al.
2009/0025027 A1 1/2009 Craner
2010/0318916 A1 12/2010 Wilkins
2015/0002618 A1 1/2015 Meek
(Continued)

OTHER PUBLICATIONS

"Live Stream a Meeting or Webinar on YouTube Live", https://web.archive.org/web/20200708015741/https:/support.zoom.us/hc/en-us/articles/360028478292-Streaming-a-Meeting-or-Webinar-on-YouTube-Live, Jul. 8, 2020, 7 Pages.

(Continued)

Primary Examiner — Sibte H Bukhari
(74) Attorney, Agent, or Firm — Novo TechIP International PLLC

(57) ABSTRACT

A method and system for managing delivery of a content stream to a plurality of devices participating in an online conference session, including delivering, to each of the devices, the content stream associated with the online conference session at a first signal quality, receiving an indication signal indicating that a first device is to broadcast the content stream, responsive to the indication signal, increasing a signal quality of the content stream delivered to the first device from the first signal quality to a second signal quality, wherein the second signal quality is higher than the first signal quality, delivering the content stream to the first device at the second signal quality, and delivering the content stream to the rest of the devices at the first signal quality or a third signal quality, wherein the third signal quality is lower than the first signal quality.

27 Claims, 9 Drawing Sheets

(56) References Cited

U.S. PATENT DOCUMENTS

| | | | |
|---|---|---|---|
| 2015/0006753 A1* | 1/2015 | Krikorian | H04N 21/43615 |
| | | | 709/231 |
| 2015/0350604 A1 | 12/2015 | Roy et al. | |
| 2018/0192003 A1 | 7/2018 | Gero et al. | |
| 2020/0007252 A1* | 1/2020 | Wang | H04N 21/274 |
| 2020/0184653 A1* | 6/2020 | Faulkner | G06T 7/248 |

OTHER PUBLICATIONS

"Stream Your Cisco Webex Meetings or Events to Facebook Live", https://help.webex.com/en-us/ka80pdb/Stream-Your-Cisco-Webex-Meetings-or-Events-to-Facebook-Live, Jan. 14, 2021, 10 Pages.

"Video Webcasts that are Simple to Run and Stunning to Watch", https://web.archive.org/web/20191218072323/https:/www.gotomeeting.com/webinar/webcast-software, Dec. 18, 2019, 6 Pages.

"International Search Report and Written Opinion Issued in PCT Application No. PCT/US22/027555", dated Jul. 27, 2022, 14 Pages.

Office Action Received for European Application No. 22729851.0 dated Jan. 9, 2024, 3 pages.

\* cited by examiner

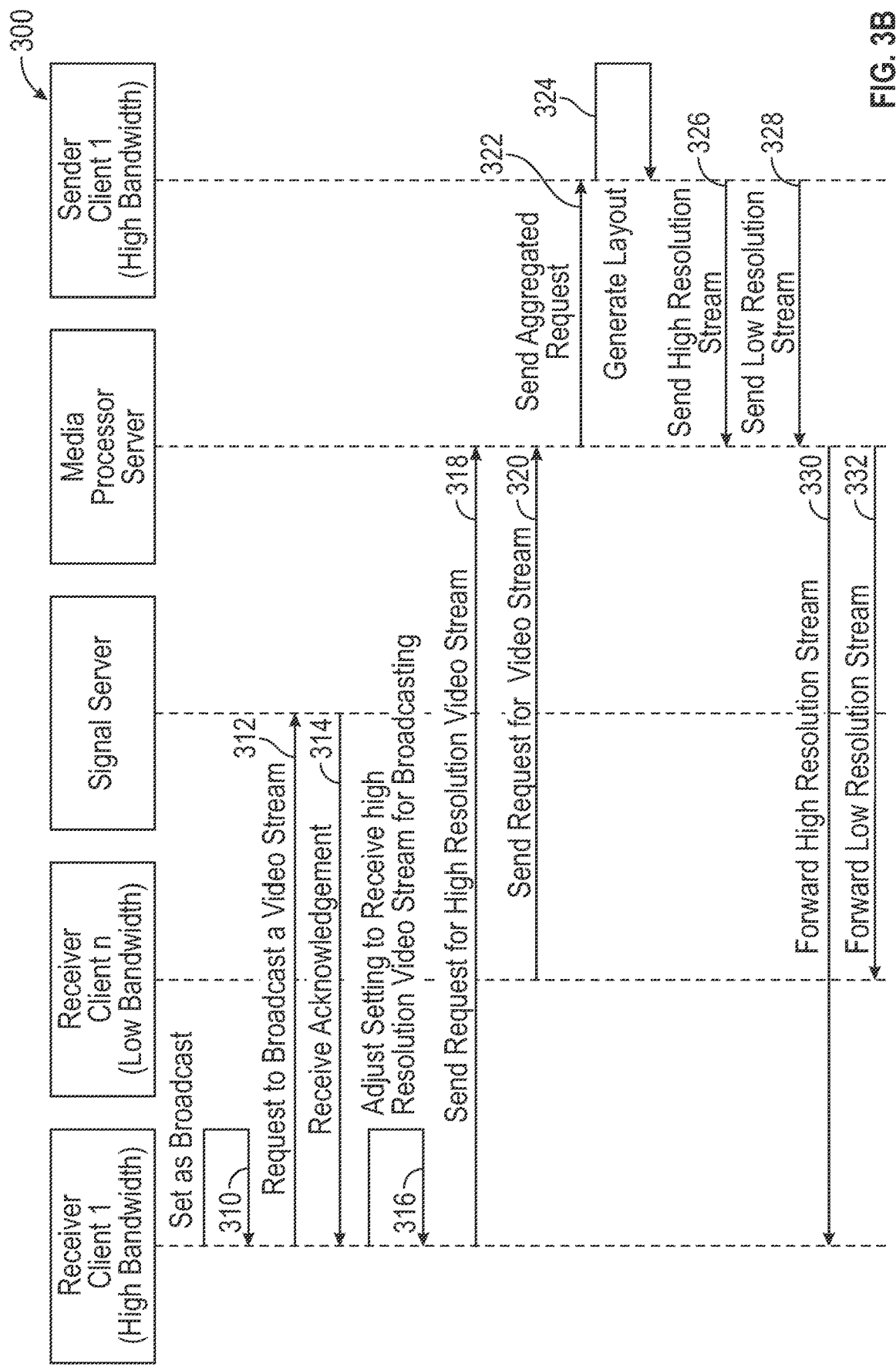

BROADCAST PRIORITY FLAGS FOR ONLINE MEETINGS

TECHNICAL FIELD

Various aspects relate to conference systems where virtual meetings take place and where a content stream may be used in a broadcast. More specifically, various aspects relate to selectively optimizing the content streams based on whether the streams are for broadcast or for closed virtual meetings.

BACKGROUND

Online meetings have become more popular as of late, and can present hybrid solutions of meeting interactivity within closed virtual meetings as well as broadcasting to one or more networks outside of closed virtual meetings. The virtual meeting themselves, as well as isolated channels of content such as, i.e., a single person's audio/video stream, can become a broadcast, or part of a broadcast workflow. Online meetings are typically optimized for a meeting experience. In this way, the meeting seeks to send as many streams of content at the highest possible quality, prioritizes screen sharing between all the participants without preference for any one participant, and may also prioritize the person speaking. In a broadcast environment, this may not be the proper prioritization as the content stream of a broadcasting participant may need to have the highest quality because it is being broadcast.

SUMMARY

In one general aspect, the instant application describes a system for managing delivery of a content stream to a plurality of devices participating in an online conference session, the system including a processor, a memory configured to store executable instructions which, when executed by the processor, cause the system to perform functions of delivering, to each of the devices, the content stream associated with the online conference session at a first signal quality, receiving an indication signal indicating that a first device is to broadcast the content stream, responsive to the indication signal, increasing a signal quality of the content stream delivered to the first device from the first signal quality to a second signal quality, wherein the second signal quality is higher than the first signal quality, and delivering the content stream to the first device at the second signal quality, and delivering the content stream to the rest of the devices at the first signal quality or a third signal quality, wherein the third signal quality is lower than the first signal quality. The above general aspect may include one or more of the following features. For another example, the indication signal identifies a content feed, from among a plurality of content feeds received from the plurality of devices participating in the online conference session, to be broadcasted by the first device.

For a further example, to increase the signal quality of the content stream delivered to the first device, the memory is further configured to store executable instructions which, when executed by the processor, cause the system to perform functions of sending instructions from a media server to a second device from among the plurality of devices to send a content stream having the second signal quality to the media server. As an additional example, to increase the signal quality of the content stream delivered to the first device, the memory is further configured to store executable instructions which, when executed by the processor, cause the system to perform functions of receiving a content stream at the second signal quality from the second device and a content stream at the first signal quality or the third signal quality from the second device.

For another example, delivering the content stream to the first device at the second signal quality comprises delivering the content stream to the first device for broadcasting the content stream at the second signal quality to other devices not participating in the online conference session. For a further example, to deliver the content stream associated with the online conference session to each of the devices, the memory is further configured to store executable instructions which, when executed by the processor, cause the system to perform functions of receiving, from the plurality of devices, a request to receive the content stream at the second signal quality, aggregating the received requests into a single aggregated request, forwarding the single aggregated request to one of the plurality of devices to receive the content stream at the second signal quality, receiving the content stream at the second signal quality in response to the single aggregated request, and determining which of the plurality of devices are capable of receiving the content stream at the second signal quality, forwarding the received content stream at the second signal quality to each of the devices determined to be capable of receiving the received content stream, and forwarding the content stream at the first signal quality or third signal quality to one or more remaining devices determined not to be capable of receiving the received content stream at the second signal quality.

For another example, the content stream includes at least one of a video stream, an audio stream, and a biometric stream.

As another example, the content stream delivered to the one or more remaining devices only includes an audio stream.

For a further example, the signal quality includes at least one of resolution, a frame rate, and a bit rate.

In another general aspect, the instant application describes a method for managing delivery of a content stream to a plurality of devices participating in an online conference session, the method including delivering, to each of the devices, the content stream associated with the online conference session at a first signal quality, receiving an indication signal indicating that a first device is to broadcast the content stream, responsive to the indication signal, increasing a signal quality of the content stream delivered to the first device from the first signal quality to a second signal quality, wherein the second signal quality is higher than the first signal quality, delivering the content stream to the first device at the second signal quality, and delivering the content stream to the rest of the devices at the first signal quality or a third signal quality, wherein the third signal quality is lower than the first signal quality.

For another example, the indication signal identifies a content feed, from among a plurality of content feeds received from the plurality of devices participating in the online conference session, to be broadcasted by the first device.

The above general aspect may include one or more of the following features. For a further example, increasing the signal quality of the content stream delivered to the first device comprises sending instructions from a media server to a second device from among the plurality of devices to send a content stream having the second signal quality to the media server. As an additional example, increasing the signal quality of the content stream delivered to the first device comprises receiving a content stream at the second signal quality from the second device and a content stream at the first signal quality or the third signal quality from the second device.

For another example, delivering the content stream to the first device at the second signal quality comprises delivering the content stream to the first device for broadcasting the content stream at the second signal quality to other devices not participating in the online conference session.

For a further example, delivering the content stream associated with the online conference session to each of the devices includes receiving, from the plurality of devices, a request to receive the content stream at the second signal quality, aggregating the received requests into a single aggregated request, forwarding the single aggregated request to one of the plurality of devices to receive the content stream at the second signal quality, receiving the content stream at the second signal quality in response to the single aggregated request, determining which of the plurality of devices are capable of receiving the content stream at the second signal quality, forwarding the received content stream at the second signal quality to each of the devices determined to be capable of receiving the received content stream, and forwarding the content stream at the first signal quality or third signal quality to one or more remaining devices determined not to be capable of receiving the received content stream at the second signal quality.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Additional advantages and novel features of these various implementations will be set forth in part in the description that follows, and in part will become more apparent to those skilled in the art upon examination of the following or upon learning by practice of the invention.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3B illustrates a flow diagram for a broadcasting process upon selection of the broadcasting icon in FIG. 3A, according to various implementations.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Broadcasting a content stream in an interactive conference setting presents a technical problem because the signal quality and bitrate requirements of broadcast are different than those for an interactive conference setting. For example, each participant in the interactive conference has an approximately equal signal quality, while in a broadcast setting, the party broadcasting typically should receive the content stream at a higher signal quality than the other parties. To address this technical problem and more, in an example, this description provides a technical solution for identifying a party that is about to broadcast a content stream such as, e.g., a video stream, an audio stream, a biometric data stream, and the like, and assign a greater signal quality to the content stream of that party compared to other parties. Accordingly, the above technical problem may be avoided when signal quality and resource constraints such as, e.g., bandwidth, are preferentially granted to the broadcasting party. For example, the server may know which content stream is being used in a broadcast solution for a specific, single client. Accordingly, a client can be utilized specifically for a broadcast solution and obtain an exclusive optimized content stream while maintaining a meeting-optimized experience for all of the meeting's attendees. The server may also be able to determine a desired prioritization based upon the client's request. Instead of simply sending a full signal quality feed of the broadcast-optimized content, the server may instead take into account resource constraints of the client device such as, e.g., bandwidth limitations, before sending the content of the meeting. When a content stream is being used in a broadcast scenario, the client may notify the server that a specific stream from that client is being utilized in a broadcast scenario, which may allow the server to determine how to best prioritize that stream to that specific client.

Figure 1:
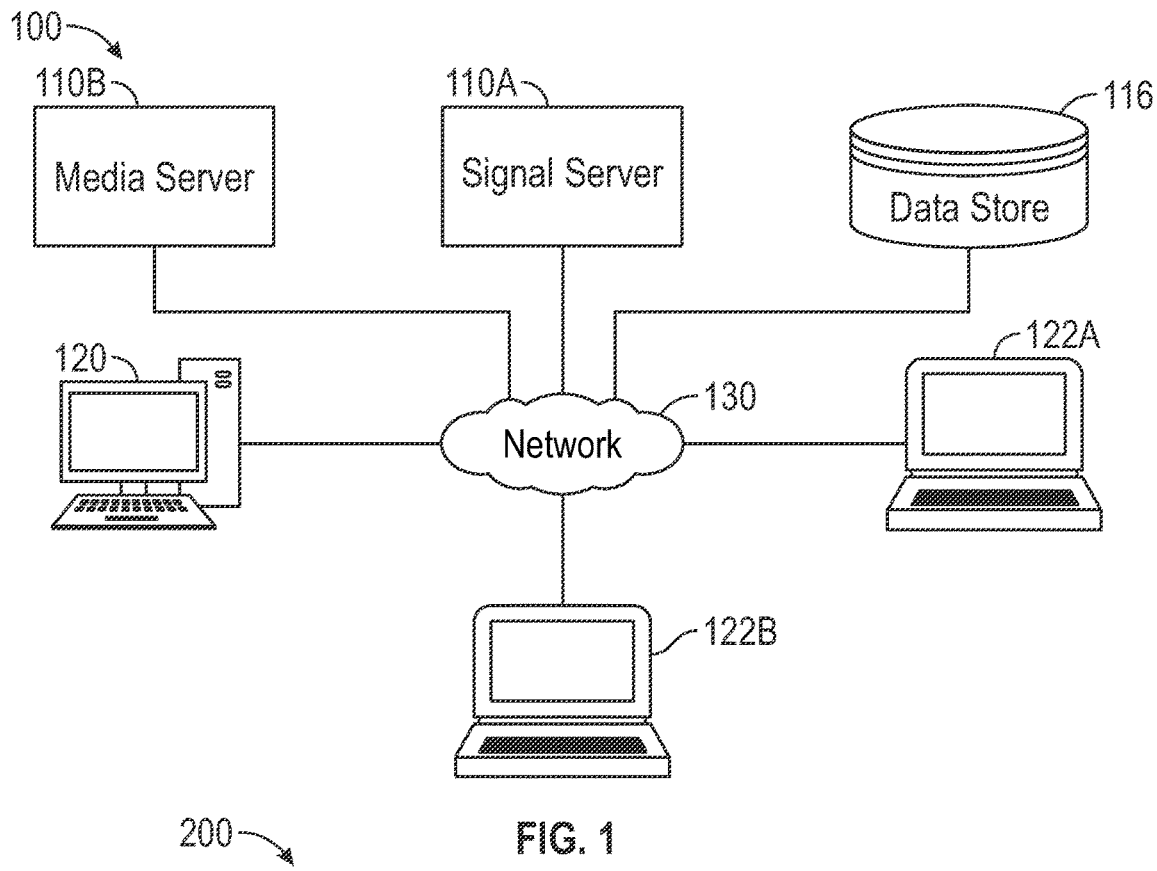
FIG. 1 depicts an example system upon which aspects of this disclosure may be implemented.

FIG. 1 illustrates an example system 100, upon which aspects of this disclosure may be implemented. The system 100 may be configured to conduct an online conference session such as, e.g., an audio/video conference session, between a plurality of participants via a plurality of client devices 120, 122A and 122B, further discussed below. Specifically, the online meeting or video conference session is conducted between one or more sending devices which are, e.g., sending a stream of content such as an audio/video stream, and a plurality of receiving which receive the content stream sent by the one or more sending devices. For example, the content stream may include, e.g., a video stream, an audio stream, a biometric data stream, and the like. The system 100 may include servers such as signal server 110A and media server 110B which may be connected to or include a data store 116 in which data relating to a communication mechanism such as a messaging application may be stored. The servers 110A and 110B may be responsible for managing communications between various devices during communication sessions. For example, the servers 110A and 110B may run an application, stored for example in the data store 116, that enables instant messaging between various participant devices. To do so, the servers 110A and 110B may receive signals from one or more of the participants and transfer those signals to other participants. The signals may be audio, video or other data signals. For example, the server may receive audio signals from a client device as part of a voice over internet protocol (VoIP) call and transmit those signals to a device indicated as the intended recipient of the VoIP call in a communication application. Video signals may be transferred during video-enabled virtual meetings to enable participants to see each other. Data signals may be transmitted to enable exchange of text messages and/or documents between participants.

The servers 110A and 110B may operate as a shared resource server located at an enterprise accessible by various computer client devices such as client devices 120, 122A and 122B. Although shown as a single server, the servers 110A and 110B may include multiple servers operating one or more communication applications that connect multiple users.

The system 100 may also include a sender client device 120 and recipient client devices 122A and 122B, each of which may be connected via the network 130 to the servers 110A and 110B. Each of the client devices 120, 122A and 122B may include or have access to a communication application which functions with the communication service (not shown) to enable users of each device to participate in communication sessions such as, e.g., online videoconferences. It should be noted that each of the client devices 120, 122A and 122B may become a sender or a receiver during a communication session.

The servers 110A and 110B may also include and/or execute an online communication service such as, e.g., a videoconferencing service. Other examples of communication services may include email, VoIP calls, virtual meetings, voicemail services, or collaborative work environments. The servers 110A and 110B may operate to enable a client device 120, 122A or 122B to invite other participants from client devices 120, 122A or 122B and to have, e.g., an online videoconference. For example, the servers 110A and 110B may manage the scheduling of the videoconference, the invitation of the various client devices participating to the videoconference, to record the videoconference, and the like. In one implementation, the server may provide a cloud-based communication service such as an online videoconferencing application operating via the network 130. The network 130 may be a wired or wireless network(s) or a combination of wired and wireless networks that connect one or more elements of the system 100.

The client devices 120, 122A and 122B may be any type of device that can communicate with the network, such as, personal or handheld computing devices having or being connected to both input and output elements. For example, client devices 120, 122A and 122B may be one of: a mobile telephone; a smart phone; a tablet; a phablet; a smart watch; a wearable computer; a personal computer; a desktop computer; a laptop computer; a gaming device/computer; a television; a thick client; a thin client; a browser-based client; an application executing on a device; an embedded widget operating on a device and the like. This list is for example purposes only and should not be considered as limiting.

In various implementations, in FIG. 1, an online meeting or video conference session or online video conferencing session is taking place between a plurality of participants via a plurality of devices such as, e.g., client devices 120, 122A and 122B. For example, the online video conferencing session is conducted between a sending device 120 which is sending a content stream such as an audio/video stream, and a plurality of receiving devices 122A and 122B which receive the content stream sent by the sending device 120. In one implementations, each of client devices 120, 122A, and 122B may be both receiving and sending video streams in an online video conferencing session. The online video conferencing session may be implemented via Microsoft Teams or Zoom or other video conferencing applications. During the video conferencing, each client device 120, 122A, 122B may share video and/or audio content with other devices 120, 122A, 122B. For example, the client device 120 may share a video of its user with the devices 122A and 122B. Similarly, the receiving device 122A may share a video of its user with the devices 120 and 122B and the receiving device 122B may share a video of its user with the devices 120 and 122A. To this end, the client device 120 may receive two video streams, one from client device 122A and another from client device 122B. Similarly, the client device 122A may receive two video streams, one from client device 120 and another from client device 122B; and the client device 122B may receive two video streams, one from client device 120 and another from client device 122A.

In various implementations, one of the receiving devices 122A or 122B may set itself to be a broadcasting device. For example, the receiving device 122A, now referred to as "broadcasting device," determines that it will broadcast the content stream received from the sending device 120 participating in the online video conferencing session. Accordingly, the broadcasting device 122A may send a request to broadcast the content stream, the request being sent to, e.g., signal server 110. In return, the signal server 110 may acknowledge the request back to the broadcasting device 122A, and the broadcasting device 122A may adjust its settings to receive a high signal quality content stream for broadcasting. For example, the signal quality may be any one of the resolution, the frame rate, and the bit rate. Specifically, if the broadcasting device 122A initially has a first signal quality, the broadcasting device 122A may adjust its settings to receive a second signal quality that is higher than the first signal quality. For example, the broadcasting device 122A may increase its decoding ability and signal quality in order to achieve a sufficient quality level of the broadcasting signal to broadcast the content stream. Because the resources such as bandwidth of the broadcasting device 122A may be limited or constrained, the encoding capabilities of the broadcasting device 122A may be decreased to account for the increase in the decoding capabilities thereof. In order to receive the content stream to be broadcasted, the broadcasting device 122A may send a request to receive an increased signal quality content stream to the media processing server 110B. Other devices such as, e.g., receiving device 122B, may also send a request to the media processing server 110B to receive the content stream provided by the sending device 120, even if they will not broadcast the received content stream. For example, the other devices send the request to receive the content stream because they are participants in the online video conferencing session. The request sent by the other devices to the media processing server 110B may not include, e.g., a request for a high signal quality content stream because the other devices are not configured to broadcast the received content stream. Also, the other devices may not vary their respective encoding and decoding capabilities.

In various implementations, the media processing server 110B aggregates the received requests received from the broadcasting device 122A as well as from the other receiving devices participating in the online video conferencing session such as receiving device 122B in a single aggregated request, and sends the single aggregated request to the sending device 120. In response to receiving the single aggregated request, the sending device 120 generates a layout of all the receiving devices participating in the online video conferencing session including receiving devices 122A and 122B. For example, the layout includes an identification of each of the devices participating in the online video conferencing session, and may also include an indication of the signal quality requested by each of the devices participating in the online video conferencing session. For example, the broadcasting device 122A may request a higher signal quality content stream, and the other receiving devices such as 122B may request a content stream at the same signal quality as during the online meeting or video conference session.

In various implementations, as a result of generating the layout, the sending device 120 may send a high signal quality content stream to the media processing server 110B, the high signal quality content stream being ultimately destined to the device requesting the high signal quality content stream, in this case the broadcasting device 122A. The sending device 120 may also send a low signal quality content stream to the media processing server 110B, the low signal quality content stream being ultimately destined to the other receiving devices such as receiving device 122B that did not request a high signal quality content stream, or that do not have sufficient resources such as, e.g., bandwidth to accommodate a high signal quality content stream.

In various implementations, in response to receiving both high signal quality and low signal quality content streams from the sending device 120, the media processing server 110B forwards the high signal quality content stream to the broadcasting device 122A, and the low signal quality content stream to the other receiving devices such as receiving device 122B. Specifically, the broadcasting device 122A may receive the content stream from the media processing server 110B at the higher signal quality so as to broadcast the content stream to other devices or networks outside of the participants to the online video conferencing session. Also, if the other receiving devices such as receiving device 122B initially receive the content stream with a first signal quality from the media processing server 110B, they may now receive the content stream at a third signal quality that is lower than the first signal quality. For example, the third signal quality may be compatible with only an audio signal, i.e., the content stream only includes an audio stream. For example, the first or second signal quality may be compatible with both an audio and a video signal i.e., the content stream includes both an audio and a video stream.

In other implementations, instead of or in addition to broadcasting the content of sending device 120 outside of the participants to the online video conferencing session, the system 100 may instead spotlight one of the devices such as, e.g., device 120. In FIG. 1, "spotlighting" as used herein refers to one of the devices participating in the online video conferencing session such as, e.g., device 120, being designated as the device that is sending a content stream, e.g., an audio and/or video stream, which is more important than other content streams received from other devices in the online video conferencing session. To this end, once spotlighted, the display screen of all the other receiving devices 122A and 122B may mostly, or only, display the content stream sent by the spotlighted device, or sending device, 120. Alternatively, the video stream of the sending device 120 being designated as a spotlighted device may have a higher signal quality than the video streams of the other devices 122A and 122B.

To illustrate one specific example, one of the receiving devices, e.g., receiving device 122A, may designate another device, e.g., device 120, as a spotlights device. In various implementations, receiving device 122A sends an indication to signal server 110A that device 120 is spotlighted. In response to receiving the designation of device 120 as a spotlighted device by receiving device 122A, the signal server 110A may send a signal to each, or to some, of the remaining receiving devices such receiving device 122A and/or receiving device 122B that device 120 is designated, or spotlighted.

Upon receiving the signal from the signal server 110A, the receiving devices 122A and 122B may adjust their settings to allow for reception of high signal quality video stream from the spotlighted client device. The setting that may be adjusted may include increasing decoding capabilities of the devices. Additionally, in order to account for resource constraints such as, e.g., a limited bandwidth, the receiving devices 122A and 122B may also decrease their encoding capabilities to compensate for the increase in decoding capabilities. The receiving device 122A may send a request to media processing server 110B to receive a content stream such as, e.g., an audio and/or video stream from the designated, or spotlighted, device 120. For example, the receiving devices 122A and 122B may send a request to the media processing server 110B to receive the content stream from the spotlighted device, e.g., from device 120, at high signal quality when the bandwidth of the receiving devices 122A and 122B is capable of receiving a high signal quality content stream. Alternatively, the receiving devices 122A and 122B may send the request to the media processing server 110B to receive the content stream at a low signal quality, corresponding to their available bandwidth In response to receiving the requests for the content stream from receiving devices 122A and 122B, the media processing server 110B may bucketize the requests, and may aggregate the requests into a single aggregated request. For example, the media processing server 110B bucketizes the requests by placing the requests for same signal qualities (i.e., a low signal quality or high signal quality) in same categories, or "buckets," resulting in one or more buckets corresponding to one or more different signal qualities. The media processing server 110B may then send the single aggregated request to the sending device, in this case to device 120.

In various implementations, upon receipt of the single aggregated request from the media processing server 110B, the sending device 120 may generate a layout of the receiving devices 122A and 122B. For example, the sending device identifies each of the receiving devices 122A and 122B along with their respective bandwidths. For example, the sending device 120 may identify the respective bandwidths and/or signal qualities of each of the receiving devices 122A and 122B in order to determine whether to send a high signal quality stream or a low signal quality stream thereto. The sending device 120 may send the content stream to the media processing server 110B, as well as information relative to the signal quality level of each of the receiving devices 122A and 122B.

In various implementations, the media processing server 110B forwards the content stream to receiving devices 122A and 122B, taking into account their high or low signal quality requests and/or capabilities. For example, the media processor confirms that the receiving device 122A has sufficient bandwidth to receive a high signal quality content stream based on the information received from the sending device 120, and forwards the high signal quality content stream to device 122A. The media processing server 110B may also forward the content stream received from the sending device 120 to device 122B. As a result, the device which was spotlighted by receiving device 122A, i.e., the sending device 120, can send the content stream to all of the other receiving devices 122A and 122B participating in the online video conferencing session.

Figure 2:
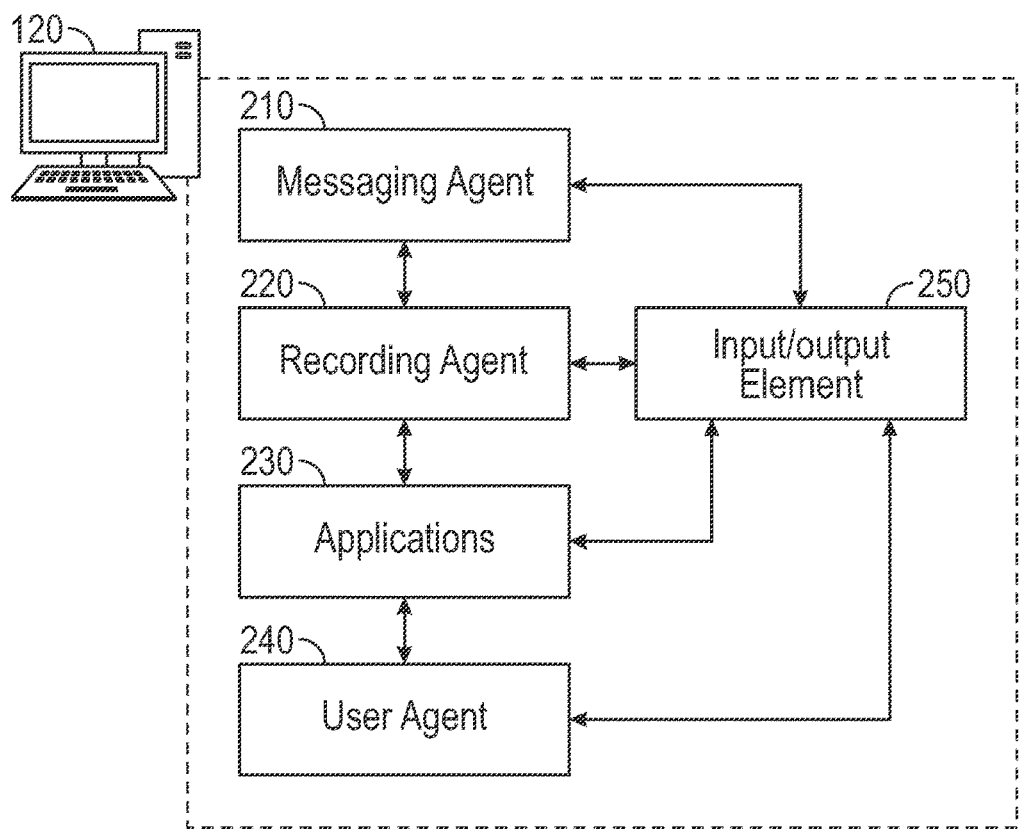
FIG. 2 depicts an example client device upon which aspects of this disclosure may be implemented.

FIG. 2 depicts an example system 200 upon which aspects of this disclosure may be implemented. In one implementation, a client device 120 may include a scheduling agent 210, a recording agent 220, one or more applications 230, and a user agent 240 each in communications with an input/output element 250. Each application 230 may be a computer program executed on the client device that configures the device to be responsive to user input to allow a user to communicate with another user. The application may send, receive, and make data (including documents and audio/video data) available by for example displaying the data on an output element of the client device. Examples of suitable applications include, but are not limited to, a videoconference application, an email application, an instant messaging application, a collaborative work application, a conferencing application, a VoIP application, and a voicemail application.

In some examples, applications 230 may include online applications that are run on the servers 110A and 110B and provided via an online service as described above. In one implementation, web applications may communicate via the network 130 with the user agent 240, which for example may be a browser executing on the client device 120. The user agent 240 may provide a user interface (UI) that allows the user to interact with the application and exchange messages with various other users. The UI may be displayed on a display device of the client device 120 by utilizing for example the user agent 240. In some examples, the user agent 240 may be a dedicated client application that provides a UI and access to electronic communications which may be stored in the data store 116. In other examples, communication applications used to communicate with other users may be local applications such as the applications 230 that are stored and executed on the client device 120 and provide a UI that allows the user to interact with application.

The applications 230 may be in communications with or may include one or more scheduling agents such as scheduling agent 210. The scheduling agent 210 may enable communication between the client devices 120, 122A and 122B to, for example, facilitate the scheduling of a videoconferencing session. The scheduling agent 210 may also be in communication with a recording agent 220 which may function to record the videoconference held between the client devices 120, 122A and 122B once the videoconference has been scheduled. Accordingly, at the time the videoconference is scheduled to start, the recording agent 220 may start recording the videoconference. In one implementation, the recording agent 220 may record the videoconference when one of the client devices 120, 122A and/or 122B sends instructions to the recording agent 220 to record the videoconference, e.g., during the videoconference.

In various implementations, in FIG. 2, an online video conferencing session is taking place between a plurality of participants via a plurality of devices such as device 120. Each of the devices may include a messaging agent 210 to communicate with other devices or to one or more servers. Each of the devices may also include a recording agent 220 to record their content and/or a content provided by another device. Each of the device may further include one or more applications 230 to perform a variety of functions defined in the application. Each of the devices may also include a user agent to allow participants to the online meeting that operate the device to interact with each other. As described above with respect to FIG. 1, one of the receiving devices may set itself to be a broadcasting device to broadcast the content stream of another one of the devices, herein referred to as a sending device, and may send a request to broadcast the content stream to a signal server via the messaging agent 210. The broadcasting device may adjust its settings to receive a high signal quality content stream for broadcasting via application 230. For example, the signal quality may be any one of the resolution, the frame rate, and the bit rate. In this case, the application 230 may be a video conferencing application and may include a broadcasting option. Specifically, the broadcasting device may increase its decoding ability and signal quality via the application 230 in order to achieve a sufficient quality level of the broadcasting signal to broadcast the content stream receiving from one of the devices participating in the online video conferencing session outside of the session. In order to receive the content stream to be broadcasted, the broadcasting device may send a request for increased signal quality content stream to a media processing server via the input/output element 250. Other devices which participate in the online video conferencing session may also send a request to the media processing server to receive the content stream via their input/output element 250. The media processing server may transmit these requests to the sending device.

In response to receiving the requests, the sending device may send a high signal quality content stream or low signal quality content stream via its input/output element 250 to the receiving devices based on the capabilities of each of the receiving devices participating in the online video conferencing session. For example, the sending device sends a high signal quality stream to the broadcasting device via the input/output element 250, and a low signal quality content stream to other devices that did not request a high signal quality content stream, or that do not have sufficient bandwidth to accommodate a high signal quality content stream, also via the input/output element 250. Accordingly, the broadcasting device may receive the content stream via its input/output element 250 at the higher signal quality so as to broadcast the content stream to other devices or to networks outside of the participants to the online video conferencing session.

In other implementations, instead of broadcasting the content of the sending device, the sending device may instead be spotlighted. To this end, the display screen of all the other devices may mostly, or only, display the content stream sent by the spotlighted device, the content being received via the input/output element 250 of each of the receiving devices. Alternatively or additionally, the content stream of the spotlighted device may receive the content stream at a higher signal quality than the other devices in order to provide a content stream of sufficient quality to be viewed by all the other devices. For example, one of the receiving devices may designate another device as a spotlighted device by sending a request originated by the messaging agent 210 and sent via the input/output element 250 to, e.g., a signal server, or to the other receiving devices participating in the online video conferencing session. In various implementations, the receiving device may send an indication originated by the messaging agent 210 and sent via the input/output element 250 to a signal server that another device is spotlighted device. In response, the other devices participating in the online video conferencing session may receive an indication via their individual input/output element 250 that one of the devices is spotlighted.

In various implementations, the other devices participating in the online video conferencing session may increase their decoding capabilities, via their applications 230, to receive a high signal quality content stream of the spotlighted client device. The other devices may send a request to a media processing server via their messaging agent 210 to receive a high signal quality content stream from the spotlighted device via the input/output element 250. In response, the media processing server may send the request to the spotlighted device, and the spotlighted device may send the high signal quality content stream to the other devices via the input/output element 250.

The input/output element 250 may also be used to display one or more UIs associated with applications 230 and to receive inputs from the user which may be used to engage in communication or update the presence status. The internal hardware structure of a client device is discussed in greater detail in regard to FIGS. 6 and 7.

Figure 3A:
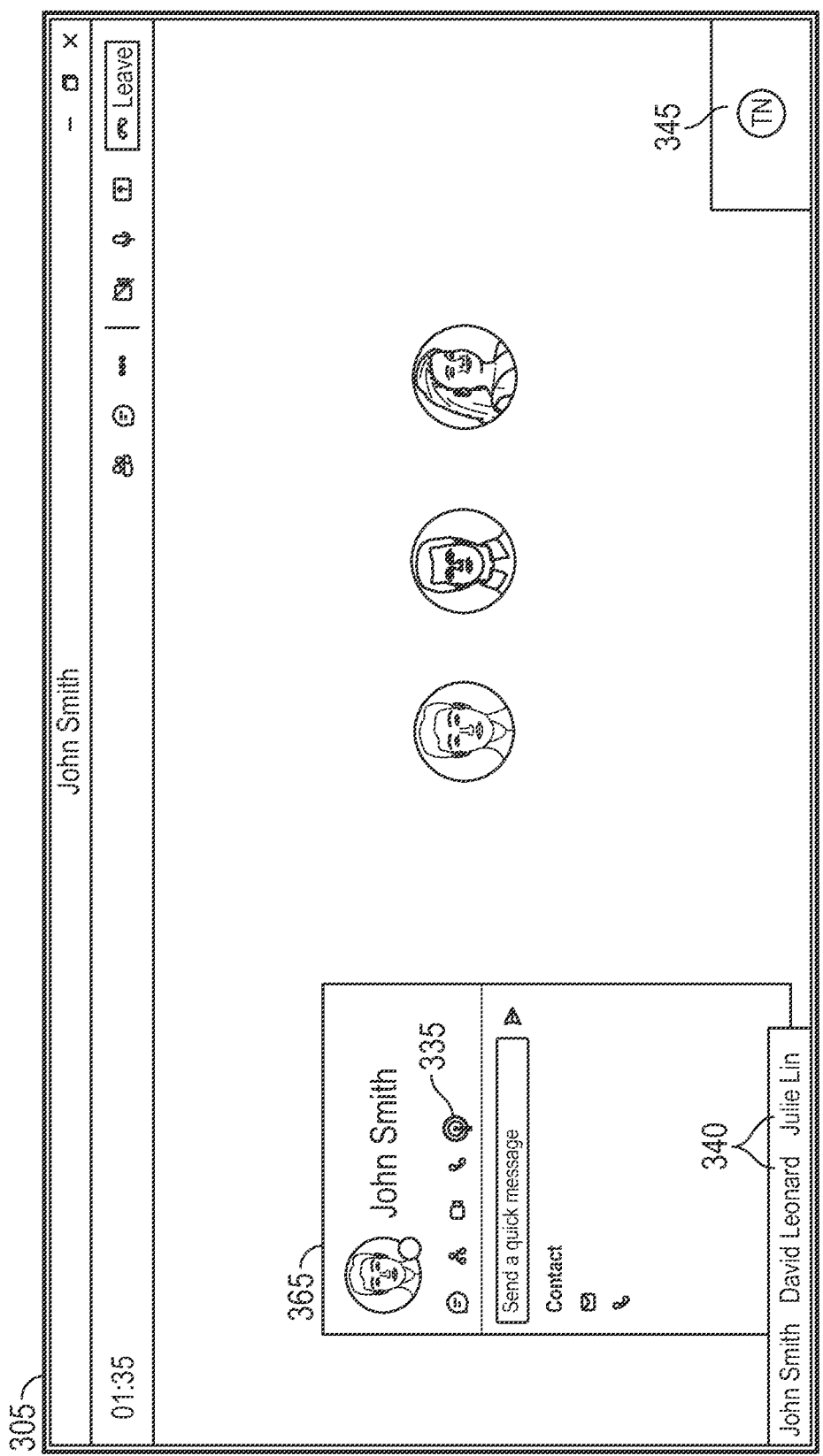
FIG. 3A illustrates a user interface for allowing one or more online meeting participants to broadcast one or more of content streams in the online meeting.

FIG. 3A illustrates a user interface for allowing one or more online meeting participants to broadcast one or more of video streams in the online meeting. Specifically, FIG. 3A illustrates a user interface 305 for allowing one or more of the online meeting participants to broadcast one or more of video streams in an online video conferencing session. For example, a plurality of participants, illustrated in FIG. 3A as John Smith, David Leonard, Julie Lin and Tom Neal, are engaged in an online video conferencing session. As a part of the online video conferencing session, each of the plurality of participants may share video and/or audio content with other participants in the online video conferencing session. For example, Tom Neal may share a content stream with John Smith, David Leonard, Julie Lin. Similarly, John Smith, David Leonard, Julie Lin may each share a content stream with Tom Neal. To this end, Tom Neal's device may receive three content streams, one from each of devices associated with John Smith, David Leonard, Julie Lin. In one implementation, the user interface 305 displays the content stream associated with John Smith, David Leonard and Julie Lin in the center area of the display screen, while Tom Neal 345 is identified in a corner of the user interface 305 as the broadcasting party.

In keeping with the previous example, Tom Neal receives the content streams from all of the participants, e.g., John Smith, David Leonard, Julie Lin 340, and may select one or more of them for broadcasting. In the example illustrated in FIG. 3A, Tom Neal has selected John Smith, at which point an overlaying display 365 may be presented in the user interface 305 of Tom Neal, and Tom Neal may select the broadcasting icon 335 to begin broadcasting the content provided by John Smith. Because only the content provided by John Smith is being broadcasted by Tom Neal in this case, the client device associated with Tom Neal becomes a broadcasting device, and receives a higher signal quality of the content stream from John Smith's device while other devices may receive a lower signal quality of the content stream from John Smith's. Accordingly, neither David Leonard nor Julie Lin request or require a higher signal quality as they are mere watchers of the video stream. The higher signal quality is advantageous to provide a good quality broadcast.

In FIG. 3A, an overlaying display 365 of the party which content stream is being broadcast, i.e., John Smith, may show identifying information relative to John Smith, as well as a broadcasting icon 335 indicating that the content stream provided by John Smith is currently being broadcast. Although the above example illustrates the user interface of only one of the participants, Tom Neal, other participants such as, e.g., David Leonard or Julie Lin, may also broadcast the content stream provided by John Smith or by any other participant.

In various implementations, some of the participants in the online conference session such as, e.g., John Smith, David Leonard, Julie Lin and Tom Neal are preliminarily authorized to broadcast the content. For example, one or more of these participants may be allowed to broadcast the shared content stream to other networks or recipients outside of the online conference session while others may not be allowed to broadcast the shared content stream. In this case, Tom Neal is allowed to broadcast John Smith's content stream. In order to broadcast John Smith's content, Tom Neal has two options: Network Device Interface (NDI) also referred to as explicit broadcasting, or Serial Digital Interface (SDI) also referred to as implicit broadcasting.

In various implementations, although not specifically shown, Tom Neal may select an option on the user interface 305 to turn on NDI to broadcast the content stream. NDI is a flexible and versatile solution that allows multiple video streams on a shared connection and that supports high quality, low latency, frame-accurate video over standard Ethernet networks. NDI may also allow for multicasting, which is group communication where content is addressed to multiple destinations simultaneously. When NDI is turned on by, e.g., Tom Neal via the user interface 305, the entire content stream is allowed to be broadcasted to an outside network such as, e.g., an intranet. Accordingly, any client device on the network that receives the broadcast and that is configured to receive an NDI signal can access the content stream from any of the participants such as, e.g., John Smith's content stream. For example, a software/hardware video mixer of the client devices of the outside network may detect the NDI signal coming out of Tom Neal's broadcast and send a signal to Tom Neal's device that broadcast can be received. For example, as soon as the recipient connects to the NDI over standard Ethernet networks, the recipient may automatically receive the content stream generated by John Smith from the device associated with Tom Neal. This type of broadcasting may be referred to as implicit broadcasting, where the broadcasting device, e.g., the device associated with Tom Neal, may not need to specifically designate a recipient device to whom to send the content stream. Accordingly, when broadcasting via NDI is started by the broadcasting device, every recipient of the broadcast will have their own content stream coming from, e.g., John Smith.

Alternatively, a SDI protocol may connect client devices such as, e.g., any one of John Smith, David Leonard, Julie Lin and Tom Neal, to outside devices via, e.g., a physical cable such as an Ethernet cable. SDI is a standard for the delivery of digital video with coaxial cable. While data speeds up to 3 gigabits per second (Gbps) are possible with SDI, the most common speed is typically in the range of 270 Mbps. SDI typically uses a standard 75-ohm cable, which is the same cable used for most home television installations. For example, the outside devices are physically connected to a camera and a video switcher to receive John Smith's content stream from the device associated with Tom Neal. This may be referred to as explicit broadcasting because broadcasting takes places when the broadcasting device, e.g., the device associated with Tom Neal, designates a broadcasting recipient outside of the online conference session participants to send the content stream via a cable. When SDI is used, a specific hardware is used to transmit the content stream, e.g., John Smith's content stream, to the cable connected to Tom Neal's device. For example, when broadcasting is performed by Tom Neal, Tom Neal may select the hardware that transmits the content stream to the outside network at different resolutions, frame rate and bitrates. Accordingly, the specific device of Tom Neal can be set to transmit the content stream from John Smith to a specific cable to transmit the content stream to another network connected to the cable. For example, Tom Neal may select an icon on the user interface 305 for sending the content stream to the hardware, also referred to as "Hardware Out." Tom Neal may further select an icon on the user interface 305 to select which devices to send the content stream outside of the online conference session, and another icon to select what resolution, frame rate or bitrate to send that content stream.

FIG. 3B illustrates a flow diagram for a broadcasting process upon selection of the broadcasting icon in FIG. 3A, according to various implementations Specifically, FIG. 3B illustrates a flow diagram 300 for a broadcasting process upon selection of the broadcasting icon 335 in FIG. 3A, according to various implementations. In FIG. 3B, an online meeting or video conference session or video conference session is taking place between a plurality of participants via a plurality of devices, referred to in the figure as "clients." With reference to FIG. 3A, the client devices, also referred to herein as receiving devices, may be John Smith, David Leonard, Julie Lin 340, and Tom Neal 345. Specifically, the online meeting or video conference session is conducted between one or more sending devices ("Sender Client 1") which are, e.g., sending a stream of content such as an audio/video stream, and a plurality of receiving devices labeled 1 through n which receive the content stream sent by the one or more sending devices. With reference to FIG. 3A, the sending device is the device associated with John Smith. FIG. 3B illustrates a single sending device as "Sender Client 1" and a plurality of receiving devices as "Receiver Client 1" through "Receiver Client n." With reference to FIG. 3A, the broadcasting process may start when Tom Neal selects the broadcasting icon 335 to broadcast the content stream provided by John Smith.

In various implementations, one of the receiving devices ("Receiver Client 1") sets itself to be a broadcasting device at 310. With reference to FIG. 3A, the receiving devices are the devices associated with David Leonard, Julie Lin 340 and Tom Neal 345. For example, the receiving client 1 which in the example illustrated in FIG. 3A is Tom Neal 345, now referred to as "broadcasting device," elects to broadcast the content stream received from one or more of the other devices participating in the online video conferencing session. For example, the device associated with Tom Neal 345 elects to broadcast the content stream received from the device associated with John Smith. At 312, the broadcasting device, i.e., the device associated with Tom Neal 345 in FIG. 3A, sends a request to broadcast the content stream provided by the sending client, i.e., John Smith in FIG. 3A, the request being sent to, e.g., a signal server that is functionally coupled to all the participants in the online video conferencing session. In return, the signal server may acknowledge the request back to the broadcasting device at 314. At 316, the broadcasting device adjusts its settings to receive a high signal quality content stream for broadcasting. Specifically, if the broadcasting device initially receives a content stream at a first signal quality, the broadcasting device adjusts its settings to be capable of receiving a second signal quality that is higher than the first signal quality. For example, the broadcasting device, i.e., the device associated with Tom Neal 345, increases its decoding ability and signal quality in order to achieve a sufficient quality level of the broadcasting signal to broadcast the content stream. Because the bandwidth of the broadcasting device may be limited, the encoding capabilities of the broadcasting device may be decreased to account for the increase in the decoding capabilities. In order to receive the content stream to be broadcasted, the broadcasting device sends a request for increased signal quality content stream to a media processing server at 318, the media processing server being functionally coupled to all the devices participating in the online meeting or video conference session. Other devices such as, e.g., the devices associated with David Leonard and Julie Lin 340 in FIG. 3A, may also send a request to the media processing server to receive the content stream provided by the sending device at 320, even when these devices do not elect to broadcast the received content stream. For example, these other devices send the request to receive the content stream as part of the online video conferencing session. The request sent by the other devices to the media processor server may not include a request for a high signal quality content stream because the other devices are not configured to broadcast the received content stream, and may not vary their encoding and decoding capabilities.

In various implementations, at 322, the media processor server aggregates the received requests from the broadcasting device as well as from the other devices participating in the online meeting or video conference session in a single aggregated request, and sends the single aggregated request to the sending device ("Sending Device 1"). In response to receiving the single aggregated request, the sending device at 324 generates a layout of all the devices. For example, the layout includes an identification of each of the devices that requested to receive the content stream, which may be all the devices participating in the online meeting or video conference session, and may also include an indication of the signal quality requested by each of the devices. For example, the broadcasting device may request a high signal quality content stream compared to the online meeting or video conference session signal quality, and the other devices may request a content stream at the same signal quality as during the online meeting or video conference session. As a result of generating the layout at 324, the sending device sends a high signal quality content stream at 326 to the media processor server, the high signal quality content stream being ultimately destined to the device requesting the high signal quality content stream, in this case the broadcasting device. For example, the sending device sends a high signal quality stream at 326 to the media processor server to be sent to the broadcasting device. The sending device may also send a low signal quality content stream at 328 to the media processor server, the low signal quality content stream being ultimately destined to the other devices that did not request a high signal quality content stream, or that do not have sufficient bandwidth to accommodate a high signal quality content stream. In implementations, the sending device is capable of sending both high quality signal and low quality signal due to the fact that the sending device has a large bandwidth and sufficient processing power. If the sending device has resource constraint, then the sending device may only send a high signal quality content stream including both audio and video to the broadcasting device and other devices in the online meeting may only receive content stream limited to audio only. The resource constraints of the sending device may include, among others, sufficient processing power, resolution, frame rate, bit rate, bandwidth, and the like. Regardless of the resource constraints of the sending device, the audio component of the content stream remains part of the content stream. In response to receiving both high signal quality and low signal quality content streams at 326 and 328 from the sending device, the media processor server forwards the high signal quality content stream to the broadcasting device at 330, and the low signal quality content stream to the other devices at 332. Specifically, at 330, the broadcasting device receives the content stream from the media processor server at the higher signal quality so as to broadcast the content stream to other devices or networks outside of the participants to the online video conferencing session. Also, if the other devices initially have a first signal quality, the media processor server forwards a content stream that is at a third signal quality that is lower than the first signal quality. For example, the content stream delivered to a device having a third signal quality may only include an audio stream, and the content stream delivered to a device having first or second signal quality may include both an audio stream and a video stream. As a result, when a device receives the content stream at the third, or lower, signal quality, they may only be able to visualize the content stream on their user interface, and not be able to broadcast it or share it with other parties outside the online video conferencing session. With reference to FIG. 3A, the device associated with participant Tom Neal may receive the content stream at a higher signal quality, and may start broadcasting the content provided by John Smith. Specifically, Tom Neal selects the icon for John Smith 340 in FIG. 3A, and when the overlaying display 365 appears as a result of the selection, Tom Neal selects the broadcasting icon 335 to begin broadcasting the content stream provided by John Smith. Although the example illustrated in FIG. 3A is that of the user interface 305 of Tom Neal, any one of the other participants to the online video conferencing session, e.g., David Leonard or Julie Lin, may similarly broadcast the content provided by, e.g., John Smith or by any other participant.

Figure 4A:
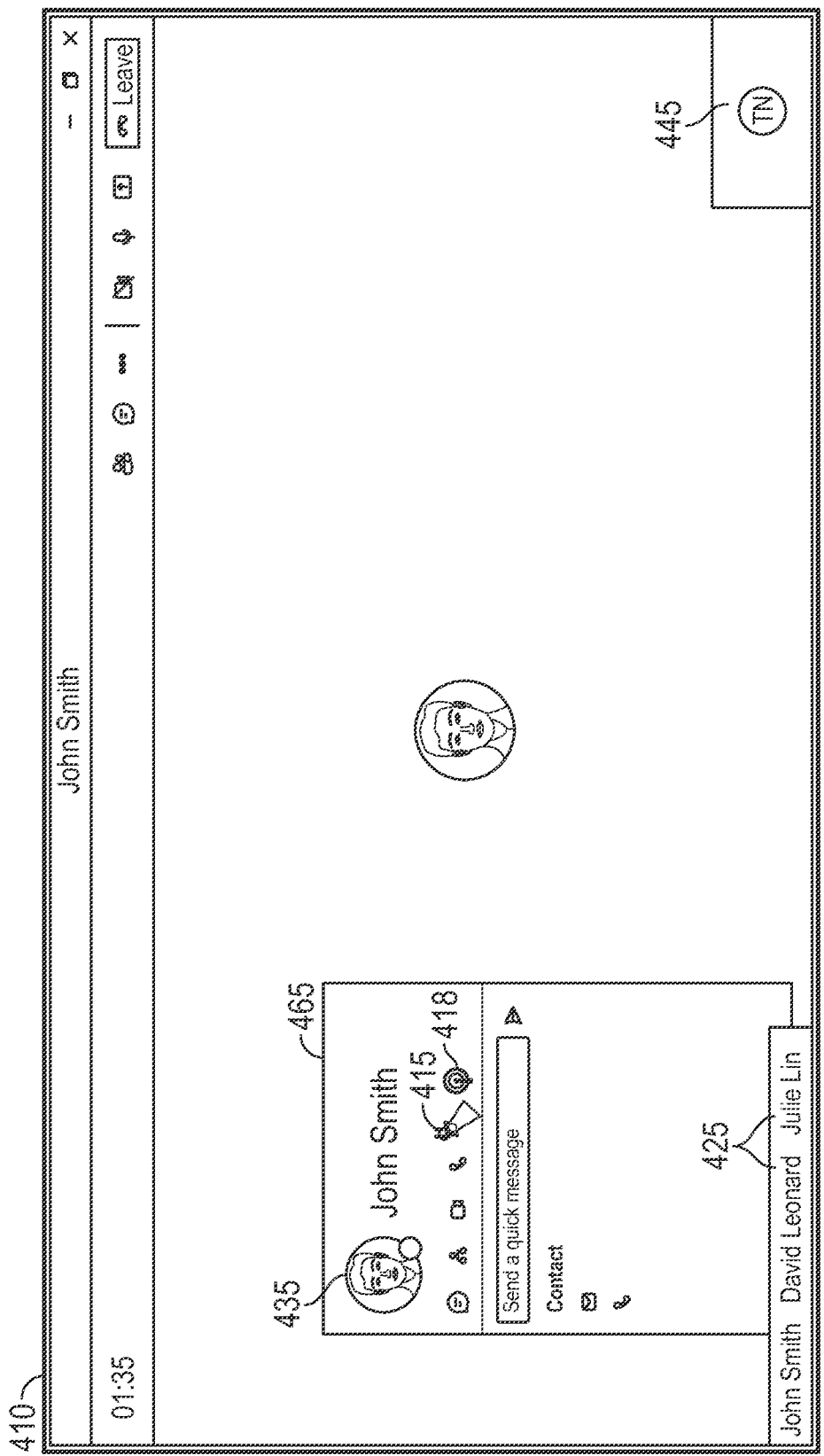
FIG. 4A illustrates a user interface for allowing one or more online meeting participants to spotlight one or more participants in the online meeting, according to various implementations.

FIG. 4A illustrates a user interface for allowing one or more online meeting participants to spotlight one or more participants in the online meeting, according to various implementations. Specifically, FIG. 4A illustrates a user interface 410 for allowing one or more of the online meeting participants to spotlight another one of the participants in the online video conferencing session. For example, a plurality of participants, illustrated in FIG. 4A as John Smith 445, David Leonard 425, Julie Lin 425 and Tom Neal 445, are engaged in an online video conferencing session. As a part of the online video conferencing session, each of the plurality of participants may share video and/or audio content with other participants in the online video conferencing session. For example, Tom Neal may share a content stream with John Smith, David Leonard, Julie Lin. Similarly, John Smith, David Leonard, Julie Lin may each share a content stream with Tom Neal. To this end, Tom Neal's device may receive three content streams, one from each of devices associated with John Smith, David Leonard, Julie Lin.

One of the participants, e.g., Tom Neal 445, may elect to spotlight the device associated with another one of the participants, e.g., John Smith 435. This may be done by selection of the spotlighting icon 415. The spotlighting icon 415 may appear next to the broadcasting icon 418 described with respect to FIG. 3A. The spotlighting icon 415 may appear by the selectin of the names of one the participants in the online video conferencing session. For example, to spotlight the video stream generated from John Smith, Tom Neal may select the icon for John Smith in the UI 410 and thereafter select the spotlighting icon 415 associated with John Smith. Similarly, to spotlight other devices in the online video conferencing session, Tom Neal may select their respective names 425 appearing in the bottom left corner of the UI 410, in one specific example, and then selecting the spotlighting icon associated with them.

"Spotlighting" as used herein refers to one of the devices participating in the online video conferencing session such as, e.g., device for John Smith 435, being designated as the device that is sending a content stream, e.g., an audio and/or video stream, which is more important than other content streams received from other devices in the online video conferencing session. To this end, once spotlighted, the display screen of all the other receiving devices including the UI 410 of Tom' device may mostly, or only, display the content stream sent by the spotlighted device 435. Alternatively or additionally, the video stream of the spotlighted device 435 may have a higher signal quality than the video streams of the other devices 122A and 122B. In the specific example shown in FIG. 4A, once the device associated with John Smith 435 is spotlighted, the content stream provided by the devices associated with any one of the other participants, e.g., David Leonard 425, Julie Lin 425 and Tom Neal 445, is no longer displayed during the online video conferencing session. Accordingly, only the content stream provided by the device associated with John Smith 435 is displayed to the other participants of the online video conferencing session.

In the example illustrated in FIG. 4A, John Smith 435 is currently spotlighted, i.e., the device associated with John Smith is the only device which content is being presented to all the other devices that are taking part in the online video conferencing session, while David Leonard 425, Julie Lin 425 and Tom Neal 445 are merely part of the video stream audience, and their content is not displayed on any of the other devices. Because only John Smith is spotlighted in this case, the client devices may receive the content stream generated by John Smith's device at a higher signal quality than non-spotlighted devices, the higher signal quality being advantageous to provide a good quality video and/or content stream to the other devices participating in the online video conferencing session. As the signal quality of the content stream of the spotlighted device, i.e., John Smith 435, increases, the signal qualitys of the content streams of the other devices participating in the online video conferencing session may be kept the same or may be reduced in order to account for a limited bandwidth of the video conferencing system. Although the above example illustrates the user interface of one of the participants, Tom Neal, other participants such as, e.g., David Leonard or Julie Lin, may also spotlight the device associated with John Smith or by any other of the participants.

Figure 4B:
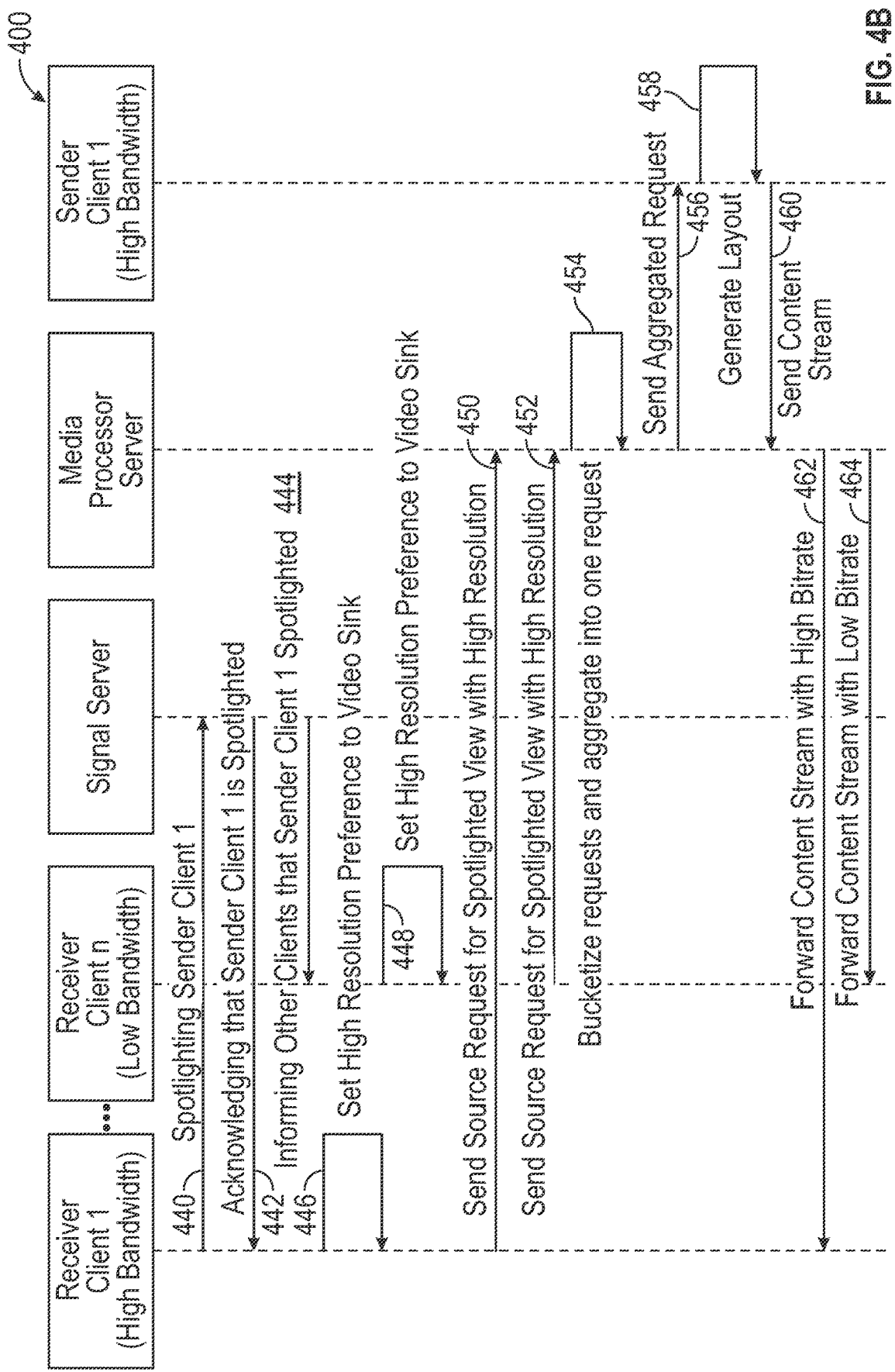
FIG. 4B illustrates a flow diagram for a spotlighting process upon selection of the spotlighting icon in FIG. 4A, according to various implementations.

FIG. 4B illustrates a flow diagram 400 for a spotlighting process upon selection of the spotlighting icon 415 in FIG. 4A, according to various implementations. In keeping with the previous example, Tom Neal receives the content streams from all of the participants, e.g., John Smith, David Leonard, Julie Lin, and may elect to spotlight any one of them. With reference to FIG. 4A, Tom Neal 445 selects the icon for John Smith 435 on its user interface 410 at 440, and when the overlaying display 465 appears as a result of the selection, Tom Neal 445 selects the spotlighting icon 415 on the user interface 410 to begin showing the content stream provided by John Smith 445 to all the other participants in the online video conferencing session, namely to Tom Neal 445, David Leonard 425 and Julie Lin 425. Although the example illustrated in FIG. 4A is that of the user interface 410 of Tom Neal 445, any one of the other participants to the online video conferencing session, e.g., David Leonard 425, Julie Lin 425 or John Smith 435, may similarly spotlight another participant to show their content to all the participants in the online video conferencing session. In keeping with previous example, "Receiver Client 1" is Tom Neal 445, and "Sender Client 1" is John Smith 445 who is being spotlighted. In various implementations, a first device among the devices, corresponding to "Receiver Client 1," sends an indication to a signal server that Sender Client 1, or John Smith 445 in FIG. 4A, is spotlighted, the signal server being functionally coupled to all the other devices participating in the online meeting or video conference session. In response to receiving the designation of Sender Client 1, or John Smith 445 in FIG. 4A, as a spotlighted device, the signal server sends an acknowledgement back to the first device, or Tom Neal 445 in FIG. 4A, at 442, acknowledging receipt of the instruction to designate, or spotlight, Sending Device 1. Also in response to receiving the designation of Sender Client 1 as a spotlighted device, the signal server sends a signal at 444 to each, or to some, of the remaining devices, or David Leonard 425 and Julie Lin 425 in FIG. 4A, that are participating in the online video conferencing session that Sender Client 1 is spotlighted.

In various implementations, at 446, the first device adjusts its setting to receive a high signal quality video stream from the Sender Client 1 by, e.g., increasing its decoding capabilities. In order to account for a limited bandwidth, the first device may also decrease its encoding capabilities to compensate for the increase in decoding capabilities. With reference to FIG. 4A, Tom Neal 445 may increase its decoding capabilities and decrease its encoding capabilities. The other devices participating in the online meeting, or some of the other devices, may also adjust their settings to receive a high signal quality video stream from the Sender Client 1 at 448 by also increasing their decoding capabilities and possibly decreasing their encoding capabilities to account for their limited bandwidth.

In various implementations, at 450, the first device, e.g., Receiving Client 1, sends a request to a media processor server to receive a content stream such as, e.g., an audio and/or video stream from the designated, or spotlighted, device, e.g., Sender Client 1, the media processor server being functionally coupled to all of the devices participating in the online meeting. In keeping with the previous example illustrated in FIG. 4A, the spotlighted device or Sender Client 1 is John Smith 435, and the first device is Tom Neal.

For example, the first client, i.e., Receiving Client 1, may send at 450 a request to the media processor server to receive the content stream from the spotlighted device, e.g., from Sender Client 1, at high signal quality when the bandwidth of the first client is capable of receiving a high signal quality content stream. At 452, the other devices, or some of the other devices, e.g., Receiving Client 2 to Receiving Client n, may also send a request to the media processor server to receive the content stream from the spotlighted device, e.g., Sender Client 1, at high signal quality, or low signal quality, depending on their bandwidth capabilities. For example, the other devices may also send at 452 a request for high signal quality. With reference to FIG. 4A, the devices associated with David Leonard 425, Julie Lin 425 and Tom Neal 445 send a request to receive the content stream of the device associated with John Smith 435.

In response to receiving the requests for the content stream from all the devices, i.e., from Receiving Client 1 to Receiving Client n, the media processor server at 454 bucketizes the requests and aggregates the requests into a single aggregated request. For example, the media processor server bucketizes the requests by placing the requests for same signal qualitys (i.e., a low signal quality or high signal quality) in same categories, or "buckets," resulting in one or more buckets corresponding to one or more different signal qualitys. At 456, the media processor server sends the single aggregated request to the sending device, i.e., Sender Client 1. With reference to FIG. 4A, the media processing server sends the single aggregated request to John Smith 435.

In various implementations, upon receipt of the single aggregated request from the media processor server at 456, the sending device, i.e., Sender Client 1, generates at 458 a layout of the devices which sent a request to receive the content stream from the sending device. With reference to FIG. 4A, the device associated with John Smith 435 generates a layout of the devices associated with David Leonard 425, Julie Lin 425 and Tom Neal 445. For example, the Sender Client 1 identifies each of the devices, including the first device, which requested to receive the content stream, along with the bandwidths of each device. For example, the Sender Client 1 may identify the respective bandwidths and/or signal qualitys of each of the devices participating in the online meeting which requested to receive the content stream in order to determine whether to send a high signal quality stream or a low signal quality stream thereto. At 460, the Sender Client 1 sends the content stream to the media processor, as well as information relative to the signal quality level of each of the devices. In implementations, the media processing server may send a content stream at 460 to all the client devices (Client 1 ... Client n) at a signal quality consistent with the capabilities of each client device. For example, a client device having the capability of receiving a high signal quality content stream may receive a high signal quality content stream, and a client device that only has the capability of receiving a low signal quality content stream may receive a low signal quality content stream. With reference to FIG. 4A, Tom Neal 445 may receive the content stream provided by John Smith 435 at a higher signal quality than, e.g., David Leonard 425 or Julie Lin 425 if John Smith 435 has the capability of receiving a high signal quality content stream while David Leonard 425 or Julie Lin 425 only have the capability of handling a low signal quality content stream.

In various implementations, at 462, the media processor server forwards the content stream receiving from the Sender Client 1 to the first device, taking into account the high signal quality request, or high bitrate request, of the first device. For example, the media processor forwards the high signal quality content stream to the first device. At 464, the media processor server forwards the content stream received from the Sender Client 1 to the remaining devices which requested the content stream. For example, the media processor sends a lower signal quality content stream to devices which do not have sufficient bandwidth to handle a high signal quality content stream, and a higher signal quality content stream to devices which have sufficient bandwidth. As a result, the device which was spotlighted by the first device at 440, i.e., the Sender Client 1, can send the content stream to all of the other devices participating in the online meeting and which requested the content stream.

Figure 5A:
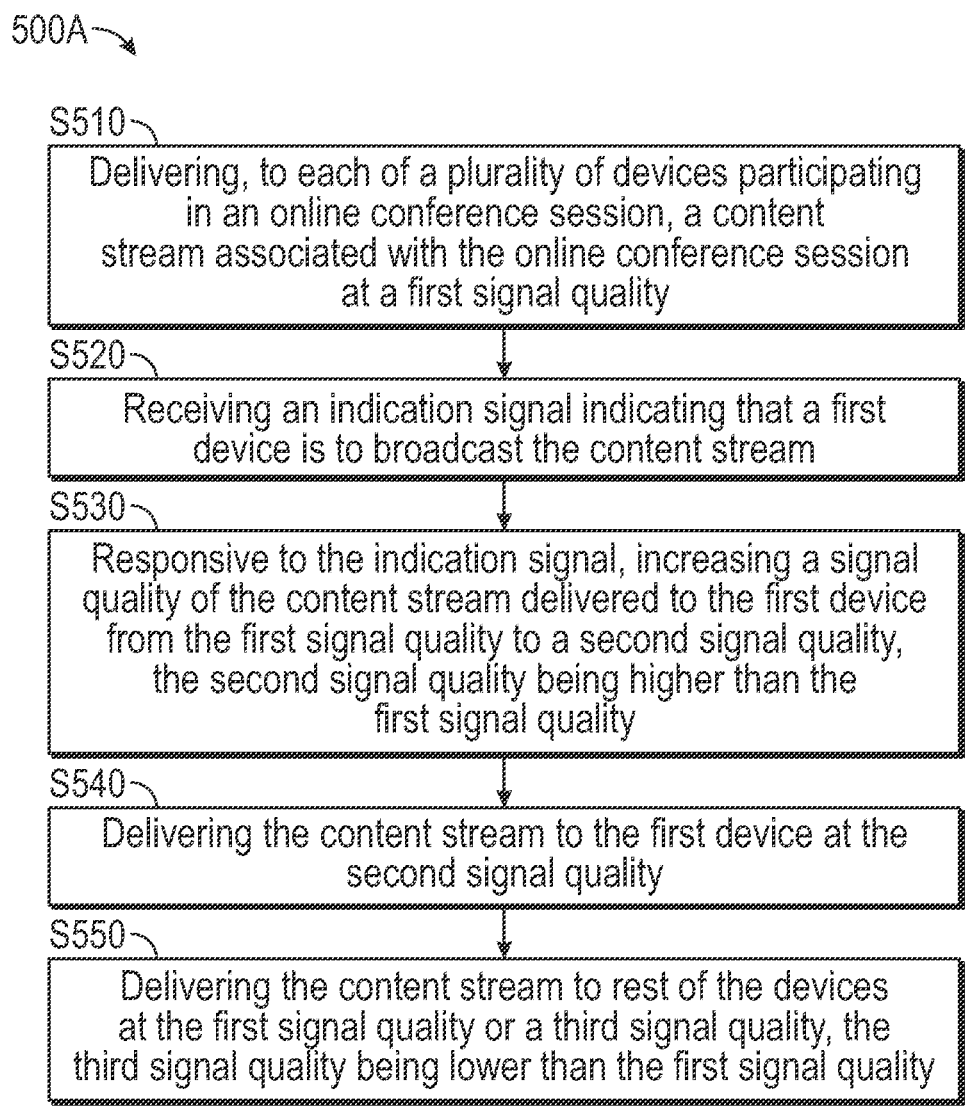
FIG. 5A is an example process for allowing one or more participants in an online conference session to broadcast one or more of content streams generated in the online conference session, according to various implementations.

FIG. 5A is an example process 500A for allowing one or more participants in an online video conference session to broadcast one or more of video streams generated in the online video conference session, according to various implementations. The process 500A starts at S510, where a media processor server delivers, to each of a plurality of devices participating in a video conference session, a video stream associated with the video conference session at a first signal quality. With reference to FIG. 3A, the participating devices are the devices associated respectively with John Smith David Leonard, Julie Lin and Tom Neal.

The process 500A continues to S520, where the media processing server receives an indication signal indicating that a first device is to broadcast the video stream. Again in keeping with the previous example illustrated in FIG. 3A, the first device or the broadcasting device is the device associated with Tom Neal 345, who wishes to broadcast the video stream associated with the device of John Smith 340. In implementations, the designation of the first device being set as a broadcasting device is received by a signal server, the signal server being functionally coupled to all the devices participating in the online meeting. In response to the designation being received by the signal server, the signal server may send an acknowledgement back to the broadcasting device that the designation has been received. The broadcasting device may then send to the media processing server the indication signal that it wishes to broadcast the video stream of a device participating in the online meeting, e.g., the device associated with John Smith 340 in the example of FIG. 3A.

The process 500A continues to S530, where responsive to the indication signal, the media processing server increases a signal quality of the video stream delivered to the first device from the first signal quality to a second signal quality, the second signal quality being higher than the first signal quality. For example, at S530, the broadcasting device may adjust its settings to receive a higher signal quality content stream for broadcasting the content stream. Specifically, if the broadcasting device initially has a first signal quality, the broadcasting device adjusts its settings to receive the content stream at a second signal quality that is higher than the first signal quality. For example, the broadcasting device may increase its decoding capabilities and signal quality in order to achieve a sufficient quality level of the broadcasting signal to broadcast the content stream. The broadcasting device may also decrease its encoding capabilities in order to accommodate for its limited bandwidth.

In various implementations, the broadcasting device sends a source request to the media processor server, the source request being a request to receive a content stream such as, e.g., an audio and/or video stream, at a signal quality sufficiently high to provide good quality broadcasting. The media processor server may be functionally coupled to all the devices participating in the online meeting. Some or all of the other devices participating in the online meeting may also send a request to the media processor server to receive the content stream. In implementations, the media processor server receives all the requests from the devices, and aggregates all the received requests into a single aggregated request before sending the single aggregated request to the sending device, which is the device generating the content stream to be broadcast by the broadcasting device.

In various implementations, the sending device generates a layout of all the devices which submitted a request, including the first device. For example, the layout includes an identification of each of the devices that requested to receive the content stream, and may also include an indication of the signal quality, i.e., high signal quality or low signal quality, requested or required by each of the devices. The sending device may then send the content stream to the media processor server.

The process 500A continues to S540, where the media processor server delivers the video stream to the first device at the second signal quality. For example, the media processor server sends a high signal quality stream received from the sending device to the first device, or broadcasting device.

Accordingly, the broadcasting device can now broadcast the content stream provided from the sending device at the high signal quality, which ensures a broadcast of sufficient quality. For example, the broadcasting device may broadcast the content stream to other channels or networks to which the broadcasting device is connected outside of the online video conferencing session.

The process 500A continues to S550, where the media processor server delivers the video stream to rest of the devices at the first signal quality or a third signal quality, the third signal quality being lower than the first signal quality. For example, the third signal quality may be only audio, and the first or second signal quality may be audio and video. For example, the sending device may send a low signal quality content stream to the media processor server, the low signal quality content stream being ultimately destined to the other devices which are part of the online video conferencing session and that did not request a high signal quality content stream, or that do not have sufficient bandwidth to accommodate a high signal quality content stream. Accordingly, the media processor server forwards the content stream to the other devices participating in the online meeting. Specifically, if the other devices initially have a first signal quality, the media processor server may forward a content stream at a third signal quality that is lower than the first signal quality.

Figure 5B:
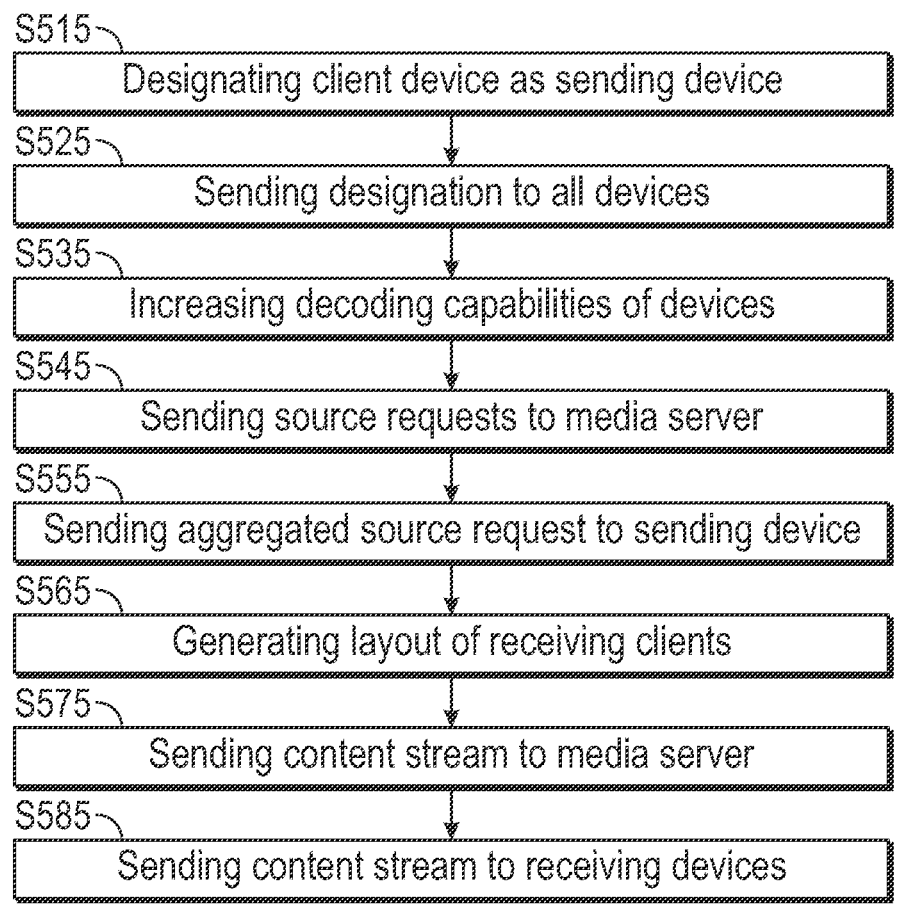
FIG. 5B is a flow chart illustrating a spotlighting process, according to various implementations.

FIG. 5B is a process 500B for spotlighting a client device in online meetings, according to various implementations. The process 500B begins at S515, where during an online meeting or video conference session, one of the participating devices, referred to herein as a first device, designates, i.e., "spotlights," at least one other device as a sending device from the devices participating in the online meeting. For example, "spotlighting" as used herein refers to one of the devices participating in the online video conferencing session being designated as the device that is sending a content stream, e.g., an audio and/or video stream, which is more important than other content streams received from other devices in the online video conferencing session. For example, the display screen of all the other devices only displays the content sent by the spotlighted device. With reference to FIG. 4A, a plurality of participants, illustrated as John Smith, David Leonard, Julie Lin and Tom Neal, are engaged in an online video conferencing session, and Tom Neal designates, or spotlights, John Smith so that all the participants in the online video conferencing session will only view the content stream provided by John Smith. With reference to FIG. 4B, a first device among the devices, referred to herein as "Receiver Client 1," designates another device, e.g., "Sender Client 1" as a sending device, or spotlights Sender Client 1. Specifically, during S515, the first device sends an indication to a signal server that another device, such as, e.g., Sender Client 1 illustrated in FIG. 4B, is spotlighted as a sending device. The process 500B continues to S525, where all the other devices participating in the online meeting receive an indication that the sending device is spotlighted. For example, the other devices receive the indication that the sending device is spotlighted from the signal server.

In various implementations, the process 500B continues to S535, where the first device adjusts its setting to receive a high signal quality video stream by, e.g., increasing its decoding capabilities. In order to account for a limited bandwidth, the first device may also decrease its encoding capabilities to compensate for the increase in decoding capabilities. The other devices participating in the online meeting, or some of the other devices, may also adjust their settings to receive a high signal quality video stream by also increasing their decoding capabilities and possibly decreasing their encoding capabilities to also account for their limited bandwidth.

In various implementations, the process 500B continues to S545, where the first device sends a request to a media processor server to receive a content stream such as, e.g., an audio and/or video stream from the designated, or spotlighted, device. For example, the first client may also send at S545 a request for a high signal quality content stream. Also at S545, the other devices, or some of the other devices, may send a request to the media processor server to receive the content stream from the designated, or spotlighted, device. For example, the other devices may also send a request for high signal quality, or for a lower signal quality due to their bandwidth capabilities.

In various implementations, the process 500B continues to S555 where, in response to receiving the requests for the content stream from the first device and from the other devices, the media processor server aggregates the requests into a single aggregated request, and sends the single aggregated request to the sending device. Upon receipt of the single aggregated request from the media processor server, the sending device at S565 generates a layout of the devices which sent the request. For example, during S565, the sending device identifies each of the devices, including the first device, which requested to receive the content stream. During S565, the sending device may also identify the respective bandwidths of each of the devices participating in the online meeting to determine whether to send a high signal quality stream or a low signal quality stream thereto.

In various implementations, the process 500B continues to S575, where the sending device sends the content stream to the media processor server, as well as information relative to the bandwidth or signal qualitys of each of the devices participating in the online meeting. At S585, the media processor server forwards the content stream to all of the devices participating in the online meeting which sent a source request at S545, taking into account the high signal quality and bandwidth requirements of each device. For example, the media processor server may confirm that any given device has sufficient bandwidth to receive a high signal quality content stream based on the information received from the sending device at S575, and may forward the high signal quality content stream to the devices. The media processor server may also forward the content stream received from the sending device to the first device which spotlighted the sending device as well as the remaining devices which participated in the online meeting. For example, the media processor may send a low signal quality content stream to devices which do not have a large bandwidth or that cannot accommodate a high signal quality. The media processor server may also send a high signal quality content stream to devices which have sufficient bandwidth to accommodate high signal quality. As a result, the device which was spotlighted by the first device at S515 may send its content stream to all of the other devices participating in the online meeting.

Figure 6:
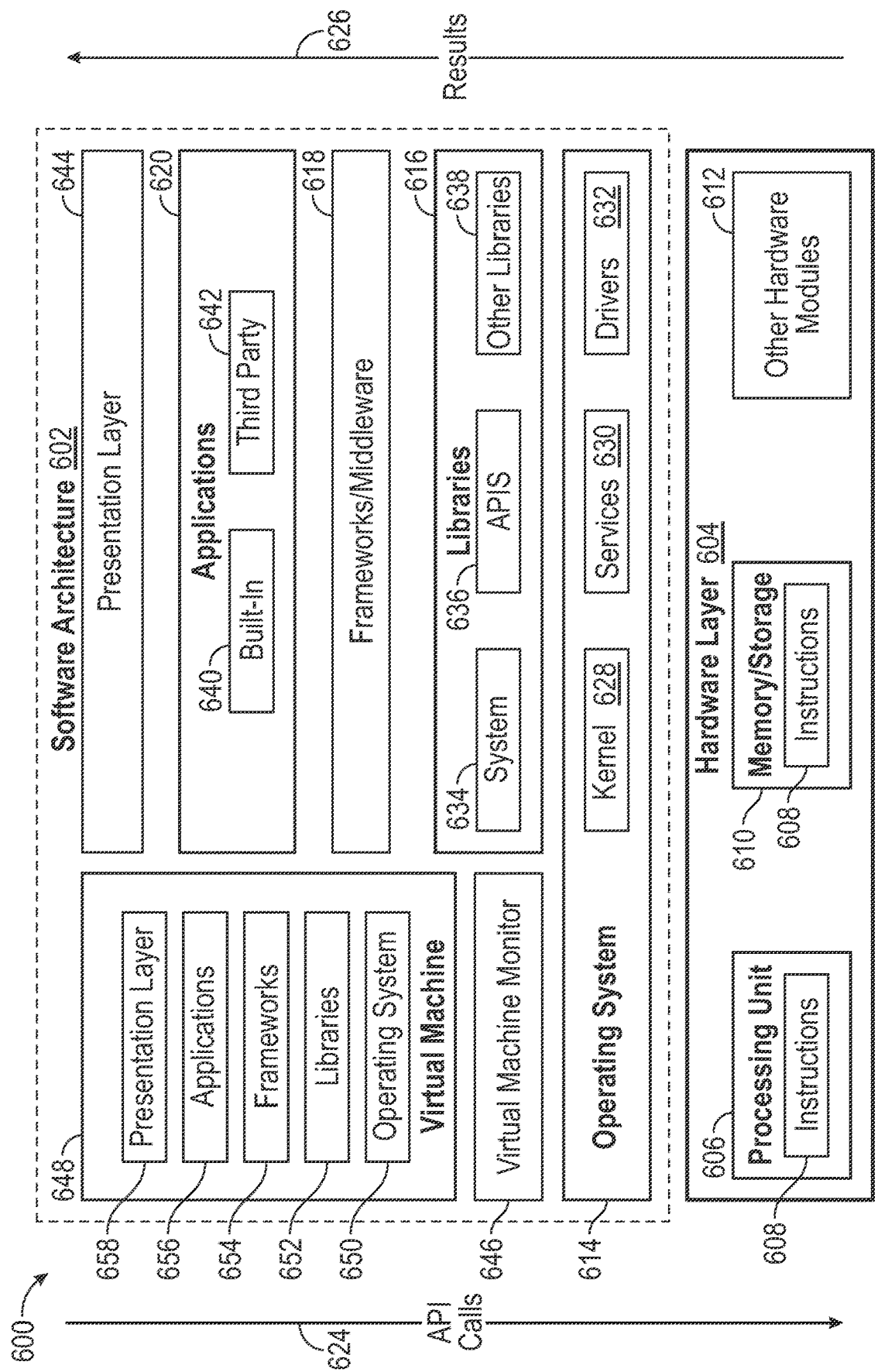
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 600 of FIG. 6, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
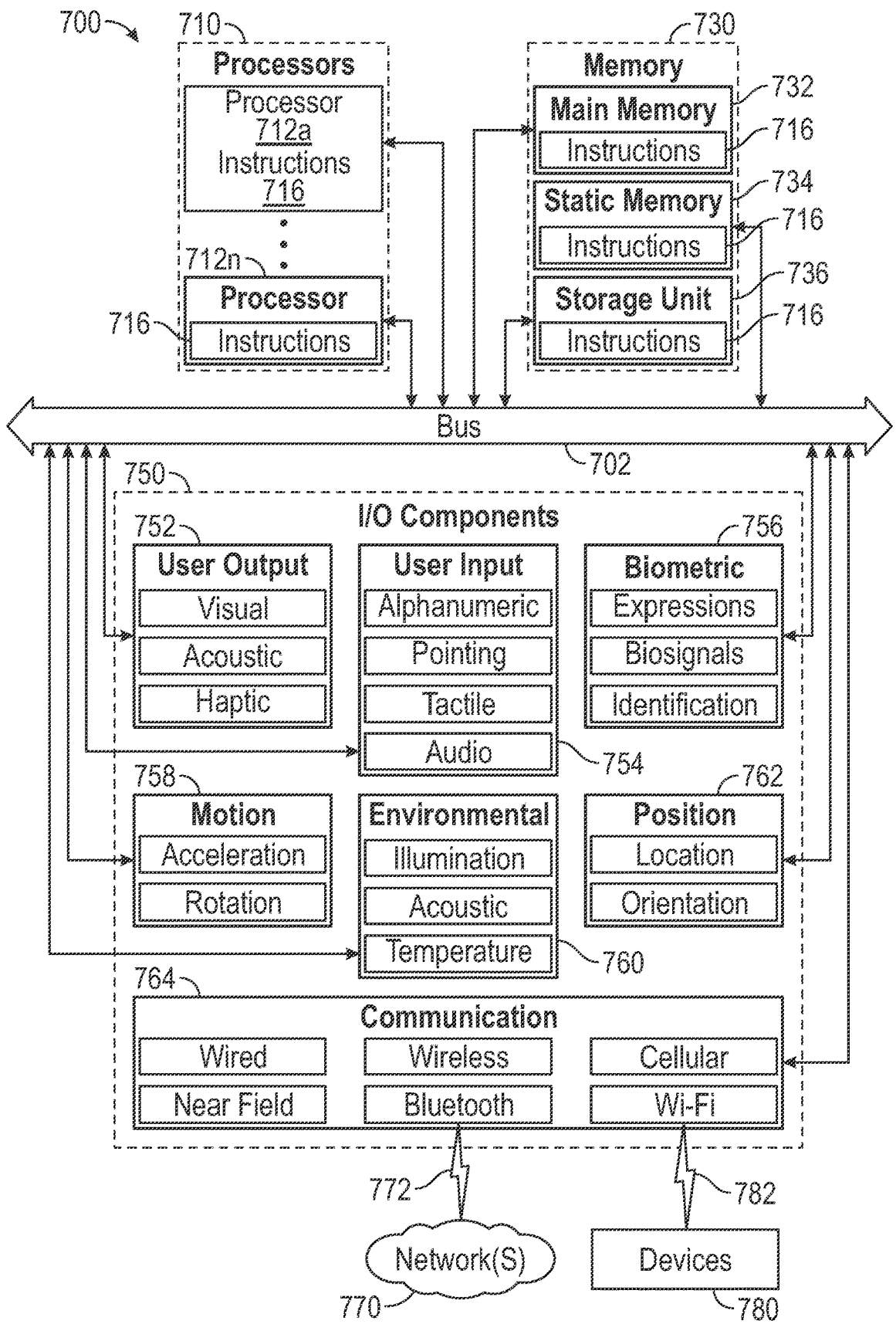
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The motion components 758 may include, for example, acceleration sensors and rotation sensors. The environmental components 760 may include, for example, illumination sensors, acoustic sensors and temperature sensors. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

In the following, further features, characteristics and advantages of the instant application will be described via the following items:

Item 1: A system for managing delivery of a video stream to a plurality of devices participating in a video conference session, the system including a processor, a memory configured to store executable instructions which, when executed by the processor, cause the system to perform functions of delivering, to each of the devices, the video stream associated with the video conference session at a first signal quality, receiving an indication signal indicating that a first device is to broadcast the video stream, responsive to the indication signal, increasing a signal quality of the video stream delivered to the first device from the first signal quality to a second signal quality, wherein the second signal quality is higher than the first signal quality, delivering the video stream to the first device at the second signal quality, and delivering the video stream to the rest of the devices at the first signal quality or a third signal quality, wherein the third signal quality is lower than the first signal quality.

Item 2: The system of item 1, wherein the indication signal identifies a video feed, from among a plurality of video feeds received from the plurality of devices participating in the video conference session, to be broadcasted by the first device.

Item 3: The system of item 1 or 2, wherein to increase the signal quality of the video stream delivered to the first device, the memory is further configured to store executable instructions which, when executed by the processor, cause the system to perform functions of sending instructions from a media server to a second device from among the plurality of devices to send a video stream having the second signal quality to the media server.

Item 4: The printer of any of items 1-3, wherein to increase the signal quality of the video stream delivered to the first device, the memory is further configured to store executable instructions which, when executed by the processor, cause the system to perform functions of receiving a video stream at the second signal quality from the second device and a video stream at the first signal quality or the third signal quality from the second device.

Item 5: The system of any of items 1-4, wherein delivering the video stream to the first device at the second signal quality comprises delivering the video stream to the first device for broadcasting the video stream at the second signal quality to other devices not participating in the video conference session.

Item 6: The system of any of items 1-5, wherein to deliver the video stream associated with the video conference session to each of the devices, the memory is further configured to store executable instructions which, when executed by the processor, cause the system to perform functions of receiving, from the plurality of devices, a request to receive the video stream at the second signal quality, aggregating the received requests into a single aggregated request, forwarding the single aggregated request to one of the plurality of devices to receive the video stream at the second signal quality, receiving the video stream at the second signal quality in response to the single aggregated request, and determining which of the plurality of devices are capable of receiving the video stream at the second signal quality, forwarding the received video stream at the second signal quality to each of the devices determined to be capable of receiving the received video stream, and forwarding the video stream at the first signal quality or third signal quality to one or more remaining devices determined not to be capable of receiving the received video stream at the second signal quality.

Item 7: A method for managing delivery of a video stream to a plurality of devices participating in a video conference session, the method including delivering, to each of the devices, the video stream associated with the video conference session at a first signal quality, receiving an indication signal indicating that a first device is to broadcast the video stream, responsive to the indication signal, increasing a signal quality of the video stream delivered to the first device from the first signal quality to a second signal quality, wherein the second signal quality is higher than the first signal quality, delivering the video stream to the first device at the second signal quality, and delivering the video stream to the rest of the devices at the first signal quality or a third signal quality, wherein the third signal quality is lower than the first signal quality.

Item 8: The method of item 7, wherein the indication signal identifies a video feed, from among a plurality of video feeds received from the plurality of devices participating in the video conference session, to be broadcasted by the first device.

Item 9: The method of items 7 or 8, wherein increasing the signal quality of the video stream delivered to the first device comprises sending instructions from a media server to a second device from among the plurality of devices to send a video stream having the second signal quality to the media server.

Item 10: The method of any of items 7-9, wherein increasing the signal quality of the video stream delivered to the first device comprises receiving a video stream at the second signal quality from the second device and a video stream at the first signal quality or the third signal quality from the second device.

Item 11: The method of any of items 7-10, wherein delivering the video stream to the first device at the second signal quality comprises delivering the video stream to the first device for broadcasting the video stream at the second signal quality to other devices not participating in the video conference session.

Item 12: The method of any of items 7-11, wherein delivering the video stream associated with the video conference session to each of the devices includes receiving, from the plurality of devices, a request to receive the video stream at the second signal quality, aggregating the received requests into a single aggregated request, forwarding the single aggregated request to one of the plurality of devices to receive the video stream at the second signal quality, receiving the video stream at the second signal quality in response to the single aggregated request, determining which of the plurality of devices are capable of receiving the video stream at the second signal quality, forwarding the received video stream at the second signal quality to each of the devices determined to be capable of receiving the received video stream, and forwarding the video stream at the first signal quality or third signal quality to one or more remaining devices determined not to be capable of receiving the received video stream at the second signal quality.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for managing delivery of a content stream to a plurality of devices participating in an online conference session, the system comprising:
   a processor; and
   a memory configured to store executable instructions which, when executed by the processor, cause the system to perform functions of:
      receiving a sending device's content stream associated with the online conference session;
      delivering, to each of the devices of the plurality of devices, a portion of the sending device's content stream associated with the online conference session at a first signal quality;
      receiving an indication signal indicating that a first device of the plurality of devices is to broadcast the portion of the sending device's content stream to at least one device not participating in the online conference session; and
      responsive to the indication signal:
         increasing a signal quality of the portion of the sending device's content stream delivered to the first device from the first signal quality to a second signal quality, wherein the second signal quality is higher than the first signal quality;
         delivering the portion of the sending device's content stream to the first device at the second signal quality; and
         delivering the portion of the sending device's content stream to rest of the devices of the plurality of devices other than the first device at the first signal quality or a third signal quality, wherein the third signal quality is lower than the second signal quality.

2. The system of claim 1, wherein the indication signal identifies which content stream, from among a plurality of content streams received from the plurality of devices participating in the online conference session, is the sending device's content stream to be broadcasted by the first device.

3. The system of claim 2, wherein to increase the signal quality of the content stream delivered to the first device, the memory is further configured to store executable instructions which, when executed by the processor, cause the system to perform functions of sending instructions from a media server to the sending device from to send a content stream having the second signal quality to the media server.

4. The system of claim 3, wherein to increase the signal quality of the content stream delivered to the first device, the memory is further configured to store executable instructions which, when executed by the processor, cause the system to perform functions of receiving a content stream at the second signal quality from the sending device and a content stream at the first signal quality or the third signal quality from the sending device.

5. The system of claim 1, wherein to deliver the content stream to the first device at the second signal quality, the memory is further configured to store executable instructions which, when executed by the processor, cause the system to deliver the content stream to the first device for broadcasting the content stream at the second signal quality to other devices not participating in the online conference session.

6. The system of claim 1, wherein to receive the indication signal indicating that the first device is to broadcast the content stream, the memory is further configured to store executable instructions which, when executed by the processor, cause the system to:
   designate the first device as a broadcasting device, and
   increase a decoding ability of the broadcasting device.

7. The system of claim 1, wherein to deliver the content stream associated with the online conference session to each of the devices, the memory is further configured to store executable instructions which, when executed by the processor, cause the system to perform functions of:
   receiving, from the plurality of devices, a request to receive the content stream at the second signal quality;
   aggregating the received requests into a single aggregated request;
   forwarding the single aggregated request to one of the plurality of devices to receive the content stream at the second signal quality;
   receiving the content stream at the second signal quality in response to the single aggregated request;
   determining which of the plurality of devices are capable of receiving the content stream at the second signal quality;
   forwarding the received content stream at the second signal quality to each of the devices determined to be capable of receiving the received content stream; and
   forwarding the content stream at the first signal quality or third signal quality to one or more remaining devices determined not to be capable of receiving the received content stream at the second signal quality.

8. The system of claim 1, wherein the content stream comprises at least one of a video stream, an audio stream, and a biometric stream.

9. The system of claim 8, wherein the content stream delivered to the rest of the devices include only an audio stream.

10. The system of claim 1, wherein the signal quality comprises at least one of a resolution, a frame rate, and a bit rate.

11. A method for managing delivery of a content stream to a plurality of devices participating in an online conference session, the method comprising:
   delivering, to each of the devices, a portion of a sending device's the content stream associated with the online conference session at a first signal quality;
   receiving an indication signal indicating that a first device of the plurality of devices is to broadcast the portion of the sending device's content stream to at least one device not participating in the online conference session;
   responsive to the indication signal, increasing a signal quality of the portion of the sending device's content stream delivered to the first device from the first signal quality to a second signal quality, wherein the second signal quality is higher than the first signal quality;
   delivering the portion of the sending device's content stream to the first device at the second signal quality; and
   delivering the portion of the sending device's content stream to rest of the devices of the plurality of devices at the first signal quality or a third signal quality, wherein the third signal quality is lower than the first signal quality.

12. The method of claim 11, wherein the indication signal identifies which content stream, from among a plurality of content feeds received from the plurality of devices participating in the online conference session, is the sending device's content stream to be broadcasted by the first device.

13. The method of claim 12, wherein increasing the signal quality of the content stream delivered to the first device comprises sending instructions from a media server to the sending device to send a content stream having the second signal quality to the media server.

14. The method of claim 13, wherein increasing the signal quality of the content stream delivered to the first device comprises receiving a content stream at the second signal quality from the sending device and a content stream at the first signal quality or the third signal quality from the sending device.

15. The method of claim 11, wherein delivering the content stream to the first device at the second signal quality comprises delivering the content stream to the first device for broadcasting the content stream at the second signal quality to other devices not participating in the online conference session.

16. The method of claim 11, wherein receiving the indication signal indicating that the first device is to broadcast the content stream comprises:
   designating the first device as a broadcasting device; and
   increasing a decoding ability of the broadcasting device.

17. The method of claim 11, wherein delivering the content stream associated with the online conference session to each of the devices comprises:
   receiving, from the plurality of devices, a request to receive the content stream at the second signal quality;
   aggregating the received requests into a single aggregated request;
   forwarding the single aggregated request to one of the plurality of devices to receive the content stream at the second signal quality;
   receiving the content stream at the second signal quality in response to the single aggregated request;
   determining which of the plurality of devices are capable of receiving the content stream at the second signal quality;
   forwarding the received content stream at the second signal quality to each of the devices determined to be capable of receiving the received content stream; and
   forwarding the content stream at the first signal quality or third signal quality to one or more remaining devices determined not to be capable of receiving the received content stream at the second signal quality.

18. The method of claim 11, wherein receiving the indication signal indicating that the first device is to broadcast the content stream comprises designating the first device as the broadcasting device.

19. The method of claim 11, wherein receiving the indication signal indicating that the first device is to broadcast the content stream comprises increasing a decoding ability of the broadcasting device.

20. The method of claim 11, wherein delivering the content stream to the first device at the second signal quality comprises sending a request to a sending device.

21. The method of claim 11, wherein the content stream comprises at least one of a video stream, an audio stream, and a biometric stream.

22. The method of claim 11, wherein the signal quality comprises at least one of a resolution, a frame rate, and a bit rate.

23. A non-transitory computer readable medium on which are stored instructions that, when executed, cause a programmable device to manage delivery of a content stream to a plurality of devices participating in an online conference session by:
   delivering, to each of the devices, a portion of a sending device's content stream associated with the online conference session at a first signal quality;
   receiving an indication signal indicating that a first device of the plurality of devices is to broadcast the portion of the sending device's content stream to at least one device not participating in the online conference session;
   responsive to the indication signal, increasing a signal quality of the portion of the sending device's content stream delivered to the first device from the first signal quality to a second signal quality, wherein the second signal quality is higher than the first signal quality;
   delivering the portion of the sending device's content stream to the first device at the second signal quality; and
   delivering the portion of the sending device's content stream to rest of the devices of the plurality of devices at the first signal quality or a third signal quality, wherein the third signal quality is lower than the first signal quality.

24. The non-transitory computer readable medium of claim 23, wherein the indication signal identifies which content stream, from among a plurality of content feeds received from the plurality of devices participating in the online conference session, is the sending device's content stream to be broadcasted by the first device.

25. The non-transitory computer readable medium of claim 24, wherein to increase the signal quality of the content stream delivered to the first device, the non-transitory computer readable medium comprises further instructions to cause the programmable device to send instructions from a media server to the sending device to send a content stream having the second signal quality to the media server.

26. The system of claim 1, wherein the first device broadcasts the content stream to at least one device not participating in the online conference session using one of a Network Device Interface (NDI) protocol and a Serial Digital Interface (SDI) protocol.

27. The system of claim 1, wherein to receive the indication signal, the memory further includes executable instructions which when executed causes the system to perform a function of receiving an indication signal that identifies the portion of the sending device's content stream, from among a plurality of content streams received from the plurality of devices participating in the online conference session, to be broadcasted by the first device, and the memory further includes executable instructions which causes the system to perform a function of:
  identifying the sending device among the plurality of devices as a device associated with the identified content stream;
  sending instructions from a media server to the sending device from among the plurality of devices to send the identified content stream having the second signal quality to the media server;
  receiving the identified content stream at the second signal quality from the sending device; and
  delivering the identified content stream to the first device at the second signal quality.

\* \* \* \* \*